(12) United States Patent
Sakuma

(10) Patent No.: US 8,321,090 B2
(45) Date of Patent: Nov. 27, 2012

(54) STEERING MECHANISM CONTROL SYSTEM

(75) Inventor: Tsuyoshi Sakuma, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 873 days.

(21) Appl. No.: 11/772,286

(22) Filed: Jul. 2, 2007

(65) Prior Publication Data

US 2008/0021612 A1 Jan. 24, 2008

(30) Foreign Application Priority Data

Jul. 21, 2006 (JP) .................................. 2006-199451

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2006.01) |

(52) U.S. Cl. ........................................... 701/41; 701/42
(58) Field of Classification Search .................. 701/41, 701/42
See application file for complete search history.

(56) References Cited

U.S. PATENT DOCUMENTS

| | | | |
|---|---|---|---|
| 6,470,994 B1 | 10/2002 | Shimizu et al. | |
| 2002/0019690 A1* | 2/2002 | Kurishige et al. | 701/41 |
| 2002/0125063 A1* | 9/2002 | Kurishige et al. | 180/443 |
| 2003/0114970 A1* | 6/2003 | Hara | 701/41 |
| 2004/0238258 A1* | 12/2004 | Ono et al. | 180/402 |
| 2006/0136108 A1* | 6/2006 | Lin et al. | 701/41 |

FOREIGN PATENT DOCUMENTS

| | | |
|---|---|---|
| EP | 1238889 | 9/2002 |
| EP | 1362765 | 11/2003 |
| EP | 1510432 | 3/2005 |
| EP | 1561668 | 8/2005 |

(Continued)

OTHER PUBLICATIONS

The Japanese Office Action of corresponding Japanese Application No. 2006-199451, dated Jul. 14, 2011 and mailed Jul. 19, 2011.

*Primary Examiner* — Thomas Tarcza
*Assistant Examiner* — Imran Mustafa
(74) *Attorney, Agent, or Firm* — Global IP Counselors, LLP

(57) ABSTRACT

A steering mechanism control system is provided with a steering angle ratio varying device, a steering angle determining section, a steering state determining section, a steering reaction force control device and a characteristic setting section. The steering angle ratio varying device controls a ratio of a steered angle of a steerable wheel with respect to a steering input angle in accordance with a steering angle characteristic. The steering angle determining section determines the steering input angle resulting from a steering operation. The steering state determining section determines a steering state based on the steering input angle. The steering reaction force control device controls a steering reaction force in accordance with a reaction force characteristic. The characteristic setting section selectively sets the steering angle characteristic and the reaction force characteristic based on the steering state determined by the steering state determining section.

17 Claims, 8 Drawing Sheets

FOREIGN PATENT DOCUMENTS

| | | |
|---|---|---|
| JP | S56-45824 | 4/1984 |
| JP | H07-052622 | 2/1995 |
| JP | H9-58508 | 3/1997 |
| JP | H11-045824 | 2/1999 |
| JP | H11-105728 | 4/1999 |
| JP | 11-208499 | 8/1999 |
| JP | 2001-200666 | 7/2001 |
| JP | 2002-370664 | 12/2002 |
| JP | 2003-072577 | 3/2003 |
| JP | 2003-261056 | 9/2003 |
| JP | 2003-306161 | 10/2003 |
| JP | 2004-001587 | 1/2004 |
| JP | 2004-017811 | 1/2004 |
| JP | 2004-026024 | 1/2004 |
| JP | 2004-050853 | 2/2004 |
| JP | 2004-098754 | 4/2004 |
| JP | 2004-196100 | 7/2004 |
| JP | 2005-306204 | 11/2005 |
| JP | 2006-159960 | 6/2006 |

\* cited by examiner

| VEHICLE SPEED | STEERING STATE | | | | REACTION FORCE CHARACTERISTIC | | STEERING ANGLE CHARACTERISTIC | |
|---|---|---|---|---|---|---|---|---|
| | SITUATION | | | | SPRING COEFFICIENT | VISCOSITY COEFFICIENT | STEERING ANGLE GAIN | STEERING ANGLE PHASE |
| | | $|\theta h|$ (deg) | $|d\theta h/dt|$ | $(d^2\theta h/dt^2)/(d\theta h/dt)$ | 0.02~0.07 (Nm/deg) | 0~0.002 (Nm/deg) | 4~25 (STEERING ANGLE/ACTUAL STEERED ANGLE) | −20~+20 (deg @ 1Hz) |
| LOW SPEED 0 TO 40 KM/H | TURNING JUST BEGUN | NEAR 0 | SMALL | POSITIVE | MEDIUM | SMALL | MEDIUM | ADVANCED |
| | CURRENTLY TURNING | -- | MEDIUM | SMALL | SMALL | LARGE | LARGE | NORMAL |
| | TURNING FINISHED | NEAR 0 | -- | NEGATIVE | LARGE | LARGE | MEDIUM | NORMAL |
| | | 15 OR LARGER | -- | NEGATIVE | MEDIUM | LARGE | LARGE | NORMAL |
| | RETURNING | 15 OR LARGER | -- | POSITIVE | MEDIUM | MEDIUM | LARGE | ADVANCED |
| HIGH SPEED 40~ KM/H | TURNING JUST BEGUN | NEAR 0 | SMALL | POSITIVE | MEDIUM | SMALL | SMALL | RETARDED |
| | CURRENTLY TURNING | -- | -- | SMALL | MEDIUM | MEDIUM | SMALL | NORMAL |
| | TURNING FINISHED | -- | -- | NEGATIVE | MEDIUM | MEDIUM | SMALL | NORMAL |
| | RETURNING | 5 OR LARGER | -- | POSITIVE | LARGE | MEDIUM | SMALL | RETARDED |

FIG. 8

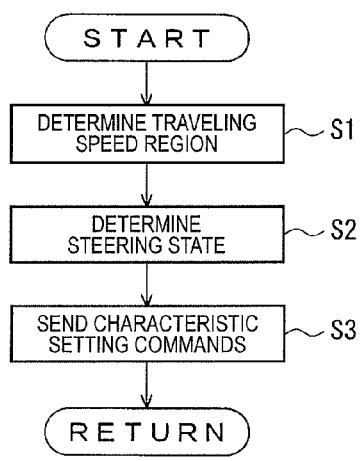

STEERING MECHANISM CONTROL SYSTEM

CROSS-REFERENCE TO RELATED APPLICATIONS

This application claims priority to Japanese Patent Application No. 2006-199451, filed on Jul. 21, 2006. The entire disclosure of Japanese Patent Application No. 2006-199451 is hereby incorporated herein by reference.

BACKGROUND OF THE INVENTION

1. Field of the Invention

The present invention generally relates to a steering mechanism control system for controlling a ratio of a steered angle of a steerable wheel with respect to a steering angle.

2. Background Information

Various steering control apparatuses have been proposed to increase the ratio of the steered angle of a steerable wheel with respect to the steering angle when traveling at a low speed to improve a turning performance at low speeds. Examples of some steering control apparatuses are disclosed in Japanese Laid-Open Patent Publication No. 9-58508, Japanese Laid-Open Patent Publication No. 2003-261056 and Japanese Laid-Open Patent Publication No. 11-105728.

SUMMARY OF THE INVENTION

Although the above mentioned steering control apparatuses can improve the turning performance of a vehicle at low speeds, the response of the vehicle with respect to operation of the steering is heightened. Thus, the vehicle changes direction by a larger amount in response to a given steering amount. Consequently, depending on the running condition of the vehicle, there is a possibility that the increased steering response will feel odd to the driver.

The present invention was conceived in view of this shortcoming in the technology described above. One object of the present invention is to provide a steering mechanism control system that can impose steering characteristics that are appropriate for a variety of running conditions.

In order to achieve the aforementioned object, a steering mechanism control system is provided with that basically comprises a steering angle ratio varying device, a steering angle determining section, a steering state determining section, a steering reaction force control device and a characteristic setting section. The steering angle ratio varying device is configured to control a ratio of a steered angle of a steerable wheel with respect to a steering input angle in accordance with a steering angle characteristic. The steering angle determining section is configured to determine the steering input angle resulting from a steering operation. The steering state determining section is configured to determine a steering state based on the steering input angle detected by the steering angle determining section. The steering reaction force control device is configured to control a steering reaction force in accordance with a reaction force characteristic, with the steering reaction force being a reaction force that acts in opposition to the steering operation. The characteristic setting section is configured to selectively set the steering angle characteristic of the steering angle ratio varying device and the reaction force characteristic of the steering reaction force control device based on the steering state determined by the steering state determining section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3($b$) is a Bode curve diagram illustrating the phase of the steering characteristic in terms of frequency during a normal steering operation without using the steering mechanism control system;

FIG. 5($b$) is a Bode curve diagram illustrating the phase of the steering characteristics in terms of frequency during a steering operation using the steering mechanism control system;

FIG. 8 is a table illustrating the relationships among the speed region, the steering state, the reaction force characteristic, and the steering angle characteristic;

FIG. 9 is a flowchart illustrating a characteristic setting process executing by the control device;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
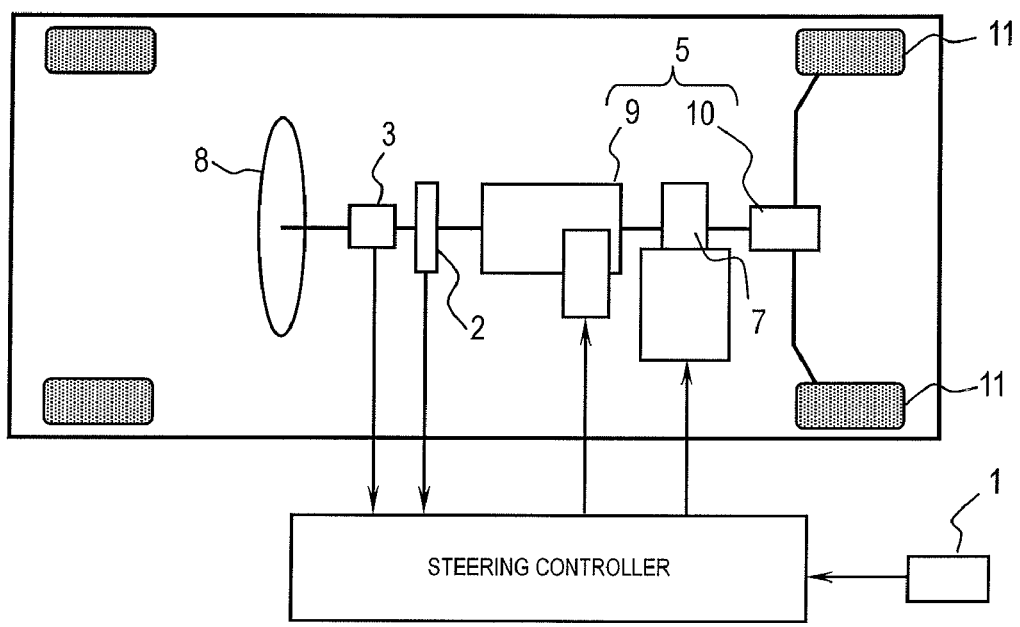
FIG. 1 is a schematic block diagram of a vehicle that is equipped with a steering mechanism control system in accordance with one embodiment of the present invention.

Referring initially to FIG. 1, a vehicle is schematically illustrated that is equipped with a steering mechanism control system in accordance with a first embodiment of the present invention. As shown in FIG. 1, the vehicle steering apparatus basically includes, among other things, a vehicle speed sensor 1, an angle sensor 2, a torque sensor 3, a variable steered angle control section 4, a steering angle ratio varying device 5, a power steering control section 6 and a power steering device 7.

As explained below, the steering mechanism control system sets a steering angle characteristic and a reaction force characteristic based on the detected traveling speed region and steering state and controls the ratio of the steered angle of a steerable wheel to the steering angle and the steering reaction force with respect to a steering operation based on the set steering angle characteristic and reaction force characteristic. Consequently, since the steering angle characteristic and the steering reaction force characteristic can be changed in accordance with the running condition of the vehicle, steering characteristics that are appropriate for a variety of running conditions can be imposed.

The variable steered angle control section 4 and the power steering control section 6 are part of a steering controller that can be a single integrated unit or several individual units that are operatively connected together. The steering controller preferably includes a microcomputer with a steering control program that controls the steering angle ratio varying device 5 and the power steering device 7 as discussed below. The steering controller includes various conventional components such as one or more microprocessors, an input/output interface (I/O) and storage devices such as a ROM (Read Only Memory) device and a RAM (Random Access Memory) device. The microcomputer of the steering controller is programmed to control among other things a reaction force characteristic of the power steering device 7 and a steering angle characteristic of the steering angle ratio varying device 5. The memory circuit stores processing results and control programs as needed to carry out the steering control as explained below. The input/output interface (I/O) of the steering controller receives input information from various vehicle sensors, namely the sensors 1, 2 and 3. Thus, the steering controller is operatively coupled to the various components of the vehicle in a conventional manner. The internal RAM of the steering controller stores statuses of operational flags and various control data. The internal ROM of the steering controller stores the various data for various operations. The steering controller is capable of selectively controlling any of the components of the control system in accordance with the control program as needed and/or desired. It will be apparent to those skilled in the art from this disclosure that the precise structure and algorithms for the steering controller can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The speed sensor 1 detects the vehicle speed and sends a signal indicative of the detected vehicle speed to the variable steered angle control section 4 and the power steering control section 6.

The angle sensor 2 detects the angle of a steering wheel 8 provided on a frontward portion of the body of the vehicle (i.e., the steering angle resulting from a steering operation) and sends a signal indicative of the detected angle to the variable steered angle control section 4 and the power steering control section 6. In this embodiment, the steering angle is expressed in terms of absolute value magnitude (positive values only).

The torque sensor 3 detects the steering torque applied by the driver and sends a signal indicative of the detected torque value to the variable steered angle control section 4 and the power steering control section 6.

The variable steered angle control section 4 calculates a command for controlling the ratio of the steered angle of the steerable wheels 11 with respect to the steering angle in accordance with a steering angle characteristic (gain and phase) and sends the calculated command to the steering angle ratio varying device 5. The command calculation is based on the vehicle speed detected by the vehicle speed sensor 1, the steering angle detected by the angle sensor 2, and the steering torque detected by the torque sensor 3.

The variable steered angle control section 4 calculates a command for setting the steering angle characteristic (i.e., a steering angle characteristic for controlling the ratio of the steered angle of the steerable wheels 11 with respect to the steering angle) based on the vehicle speed detected by the vehicle speed sensor 1, the steering angle detected by the angle sensor 2, and the steering torque detected by the torque sensor 3. The variable steered angle control section 4 then sends the command to the steering angle ratio varying device 5. These operations executed by the variable steered angle control section 4 constitute a characteristic setting process described in more detail later.

More particularly, the variable steered angle control section 4 sets the steering angle characteristic such that the ratio of the steered angle of the steerable wheels 11 to the steering angle is larger (i.e., sets the gain of the steering angle characteristic to a larger value) when the vehicle is traveling slowly and it is necessary to turn the steerable wheels 11 sharply, such as when the vehicle is turning a corner or being parked. Thus, since the traveling speed is low, the variable steered angle control section 4 sets the steering angle characteristic such that the steered angle of the steerable wheels 11 changes by a larger amount with respect to a given steering amount and such that rapid steering or fine steering can be accomplished without a problem (i.e., sets the gain and phase such that the steering performance is improved).

Meanwhile, when the vehicle is traveling at a medium to high speed, i.e., when the steering amount is small and rapid steering will not be attempted, the variable steered angle control section 4 sets the steering angle characteristic such that the ratio of the steered angle of the steerable wheels 11 to the steering angle of the steering wheel 8 is reduced (i.e., sets the gain of the steering angle characteristic to a smaller value). Thus, since the traveling speed is fast, the variable steered angle control section 4 sets the steering angle characteristic such that the steered angle of the steerable wheels 11 changes by a smaller amount with respect to a given steering amount and such that rapid steering or fine steering can be accomplished without a problem (i.e., sets the gain and phase such that the stability of straight travel is improved).

In response to the command sent from the variable steered angle control section 4, the steering angle ratio varying device 5 adds a steering angle imposed by a steering assist motor (not shown) to the steering angle resulting from the steering operation, thereby controlling the ratio of the steered angle of the steerable wheels 11 to the steering angle in accordance with the set steering angle characteristic.

Figure 2:
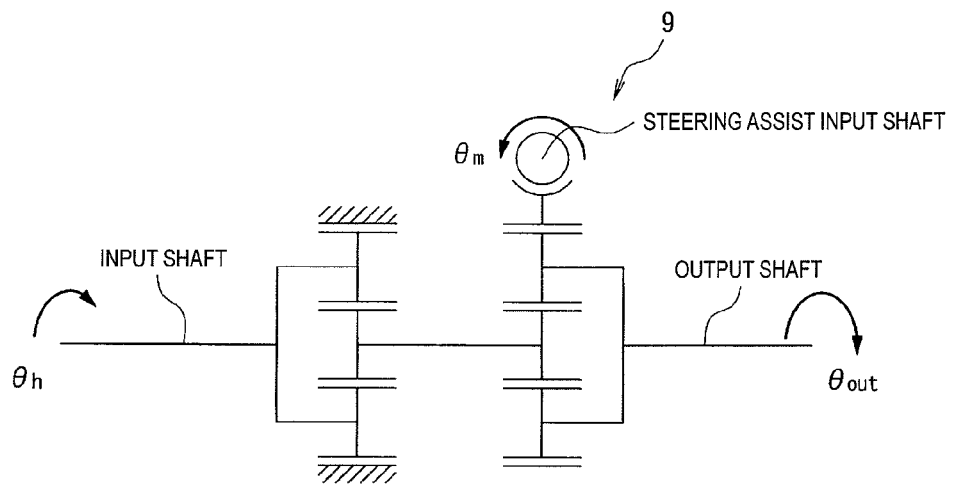
FIG. 2 is a schematic diagram of the variable steering device used in the steering mechanism control system illustrated in FIG. 1.

More specifically, in the configuration shown in FIG. 1, the steering angle ratio varying device 5 includes a planetary gear mechanism 9 and a worn gear mechanism 10. The planetary gear mechanism 9 is schematically shown in FIG. 2. The output shaft of the steering wheel 8 is connected to an input shaft of an input element of the planetary gear mechanism 9. An output shaft of an output element of the planetary gear mechanism 9 is connected to rotate a pinion gear of the worm gear mechanism 10. Another element of the planetary gear mechanism 9 is connected to an output shaft of the steering assist motor (steering assist input shaft). The steering angle θh resulting from steering operation is multiplied by a transfer ratio Kh (angle transfer ratio between the input shaft and the output shaft) and the steering angle θm resulting from the steering assist motor is multiplied by a transfer ratio Km (angle transfer ratio between the motor and the output shaft). The two products are added together to obtain the angle θout of the output shaft of the planetary gear mechanism 9 (see the equation (1) below).

$$\theta out = Kh \times \theta h + Km \times \theta m \quad (1)$$

The rotation of the pinion gear causes the worm gear mechanism 10 to move a rack in the lateral (transverse) direction of the vehicle, and thus, to turn the steerable wheels 11 by using tie rods and knuckle arms. With this configuration, the steering angle ratio varying device 5 can control the angle θout of the output shaft by controlling the steering angle θm of the steering assist motor. Consequently, the ratio of the steered angle of the steerable wheels 11 to the steering angle can be controlled independently of the steering angle θh resulting from operation of the steering wheel 8.

The equation (1) can be expressed as shown in the equation (2) below by applying a Laplace transform thereto.

$$\Theta out(s) = Kh \times \Theta h(s) + Km \times \Theta m(s) \quad (2)$$

The variable steered angle control section 4 sets the steering angle θm produced by the steering assist motor based on the steering angle θh resulting from operation of the steering wheel 8. When the variable steered angle control section 4 sets the steering angle θm, the characteristics of the angle sensor 2 and the motor controller (not shown) and the transfer characteristic of the steering angle ratio varying device 5 (variable steering system) are used to define a transfer function GVGR(s) contrived to take the steering angle θh resulting from operation of the steering wheel 8 as an input and produce the steered angle θm of the steering assist motor as an output. With the function GVGR(s), the aforementioned equation (2) can be expressed as shown in the equation (3) shown below.

$$\begin{aligned}\Theta out(s) &= Kh \times \Theta h(s) + Km \times \Theta m(s) \\ &= Kh \times \Theta h(s) + Km \times GVGR(s) \times \Theta h(s) \\ &= (Kh + Km \times GVGR(s)) \times \Theta h(s)\end{aligned} \quad (3)$$

As shown in the equation (3), the transfer function GVGR(s) enables a transfer characteristic that relates the steering angle θh resulting from operation of the steering wheel 8 to the angle θout of the output shaft of the planetary gear mechanism 9 to be obtained.

Figure 3A:
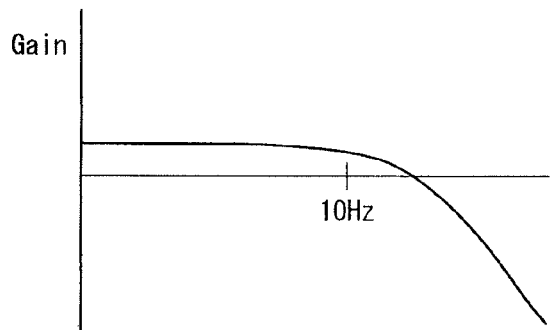
FIG. 3($a$) is a Bode curve diagram illustrating the gain of the steering characteristic in terms of frequency during a normal steering operation without using the steering mechanism control system.
Figure 3B:
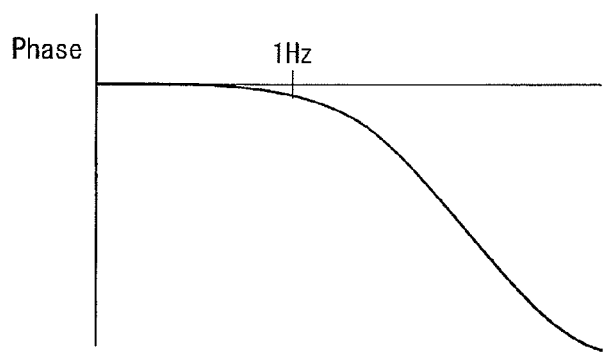

The transfer function GVGR(s) is determined based not only on the characteristics of the angle sensor 2 and motor controller and the transfer characteristic of the steering angle ratio varying device 5, but also on a variable steering control program (computer processing executed by the variable steered angle control section 4) serving to control the steering angle ratio varying device 5. The characteristic of a transfer function is generally expressed as a gain versus frequency characteristic and a phase versus frequency characteristic, as shown in FIG. 3. Furthermore, the shapes of the gain versus frequency characteristic and the phase versus frequency characteristic can be modified as desired by changing the parameters of the transfer function.

Figure 4:
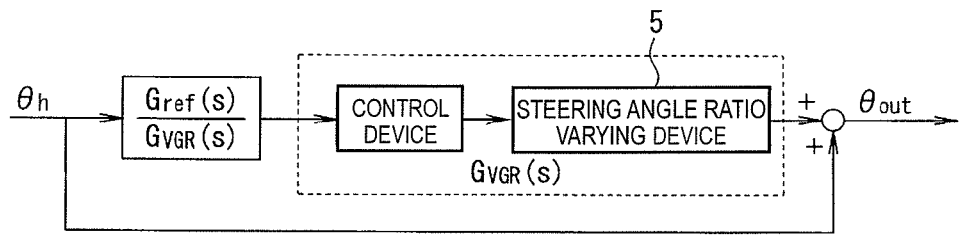
FIG. 4 is a schematic block diagram for illustrating one method of controlling (setting) the steering characteristics of the steering mechanism control system illustrated in FIG. 1.
Figure 5A:
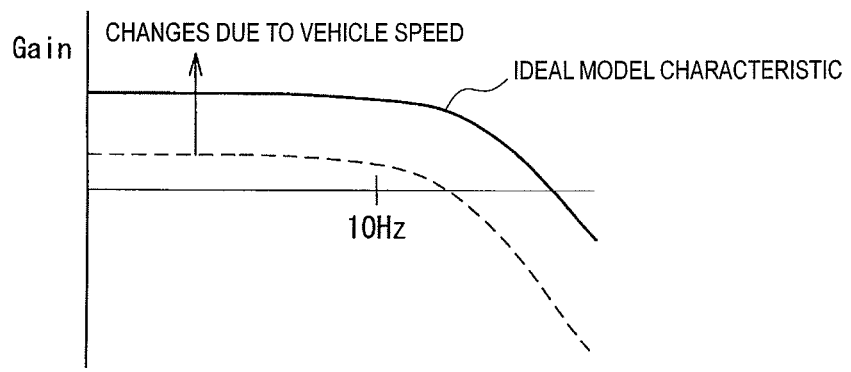
FIG. 5($a$) is a Bode curve diagram illustrating the gain of the steering characteristics in terms of frequency during a steering operation using the steering mechanism control system.
Figure 5B:
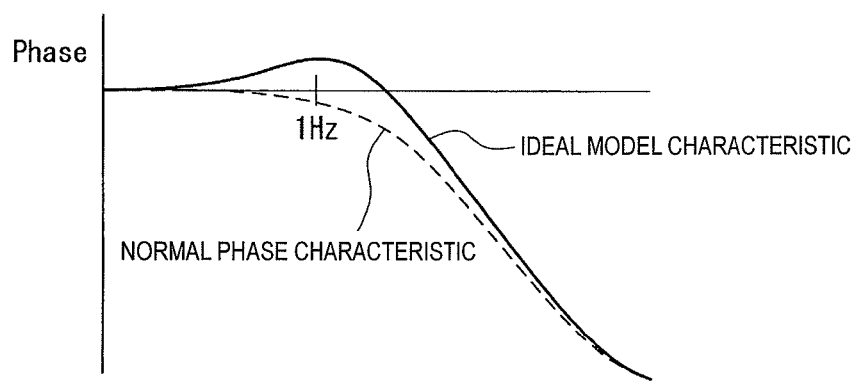

Therefore, this embodiment employs a method called "model following control," which is contrived to modify the transfer characteristic of a system having a specific transfer characteristic to any desired characteristic. As shown in FIG. 4, the characteristic setting process artificially adds the characteristic expression Gref(s)/GVGR(s) to the transfer characteristic of the variable steering system. As shown in FIG. 5, the steering characteristics (gain and phase) are set by making the characteristic of the system as a whole identical to an ideal model Gref(s) (see the equations (4) and (5) below and FIG. 5).

$$\begin{aligned}\Theta m(s) &= (Gref(s)/GVGR(s)) \times GVGR(s) \times \Theta h(s) \\ &= Gref(s) \times \Theta h(s)\end{aligned} \quad (4)$$

$$\begin{aligned}\Theta out(s) &= Kh \times \Theta h(s) + Km \times \Theta m(s) \\ &= Kh \times \Theta h(s) + Km \times Gref(s) \times \Theta h(s) \\ &= (Kh + Km \times Gref(s)) \times \Theta h(s)\end{aligned} \quad (5)$$

Based on the vehicle speed detected by the vehicle speed sensor 1, the steering angle detected by the angle sensor 2, and the steering torque detected by the sensor 3, the power steering control section 6 calculates a command for adding an assist torque to the output shaft of the planetary gear mechanism 9 so as to decrease the steering torque applied by the driver (i.e., a command for controlling the reaction force exerted by the power steering device 7 in response to a steering operation based on a reaction force characteristic (viscosity coefficient and spring coefficient)). The power steering control section 6 then sends the command to the power steering device 7.

The power steering control section 6 calculates a command for setting the reaction force characteristic (i.e., a reaction force characteristic for controlling the reaction force exerted by the power steering device 7 in response to a steering operation) based on the vehicle speed detected by the vehicle speed sensor 1, the steering angle detected by the angle sensor 2, and the steering torque detected by the torque sensor 3. The power steering control section 6 then sends the command to the power steering device 7. These operations executed by the power steering control section 6 constitute a characteristic setting process.

In accordance with the command from the power steering control section 6, the power steering device 7 controls the reaction force exerted in response to the steering operation based on the reaction force characteristic (i.e., reduces the steering torque applied by the driver) by subtracting the assist torque TEPS exerted by a torque assist motor (not shown) from the steering reaction force Ts exerted from the steerable wheels 11.

Figure 6:
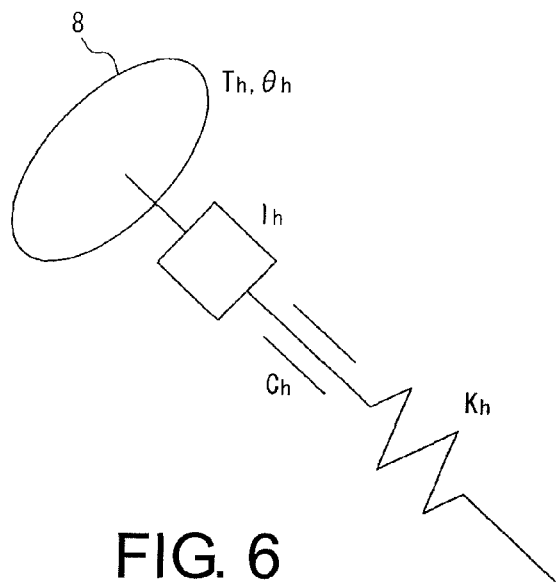
FIG. 6 is a schematic diagram of a steering system for explaining the basic mechanics of the steering system.

The mechanical model of the steering system generally used by a power steering device can be expressed approximately as shown in the equation (6) below and in FIG. 6.

$$Th = Ts - TEPS \qquad (6)$$
$$= Ih \times d^2\theta h/dt^2 + Ch \times d\theta h/dt + kh \times \theta h$$

In the equation above, the parameter Ih is an inertia coefficient for the steering system, the parameter Ch is a viscosity coefficient for the steering system, the parameter Ch×dθb/dt is a viscosity expression, the parameter kh is a spring coefficient for the steering system, and the parameter kh×θh is a spring expression.

The equation (6) establishes a specific relationship between the assist torque TEPS exerted by the torque assist motor and the parameters Ih, Ch, and kh of the reaction force characteristic.

Consequently, in this embodiment, the reaction force characteristic (spring coefficient kh and viscosity coefficient Ck) can be set by appropriately controlling the assist torque TEPS in accordance with the equation (6).

Figure 7:
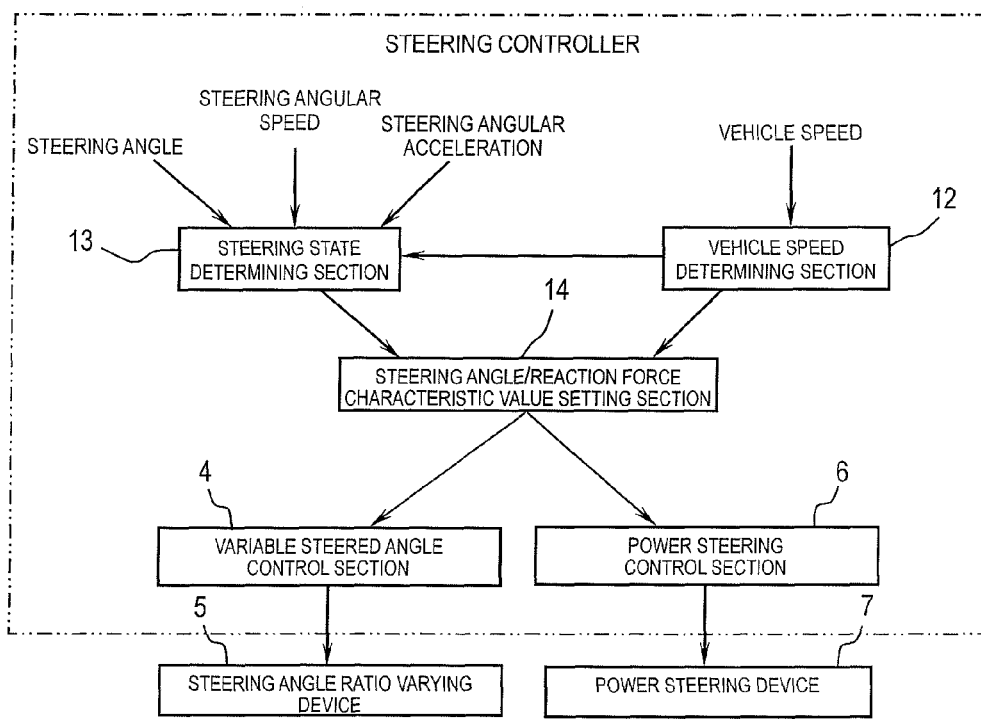
FIG. 7 is a block diagram illustrating a software configuration for executing computer processing in order to set the steering characteristics.

Now the operation of the power steering control section 6 and the variable steering angle device 4 will be discussed. The software configuration used to realize the characteristic setting process executed by the power steering control section 6 and the variable steering angle device 4 will now be explained with reference to the block diagram shown in FIG. 7. As shown in FIG. 7, the characteristic setting software comprises a vehicle speed determining section 12, a steering state determining state section 13, and a steering angle/reaction force characteristic value setting section 14.

The vehicle speed determining section 12 determines the traveling speed region of the vehicle (low speed region or medium to high speed region) based on the vehicle speed detected by the vehicle speed sensor 1 and sends the determined traveling speed region to the steering state determining section 13 and the steering angle/reaction force characteristic value setting section 14. More specifically, the vehicle speed determining section 12 determines that the vehicle is in a low speed region if the vehicle speed is equal to or smaller than 40 km/h (prescribed value) and determines that the vehicle is in a medium to high speed region if the vehicle speed is larger than 40 km/h.

The steering state determining section 13 determines the steering state achieved by the driver (i.e., whether the steering wheel has just begun to be turned, is currently turning, has just finished being turned, or is currently returning from a turned state) based on the steering angle θh detected by the angle sensor 2, the steering angular speed dθh/dt and the steering angular acceleration $d^2\theta h/dt^2$ calculated based on the steering angle θh, and the traveling speed region outputted from the vehicle speed determining section 12. The steering state determining section 13 then sends the determined steering state to the steering angle/reaction force characteristic value setting section 14. In this embodiment, the steering angular speed is expressed in terms of an absolute value magnitude (positive values only) and the steering angular acceleration is expressed as an amount of change per unit time of the steering angular speed (i.e., as a derivative value of the steering angular speed). The term "just begun turning" as used herein refers to a steering state or condition of a steering operation in which the steering wheel 8 is being operated within a prescribed degree of turning that is near straight. The term "currently turning" as used herein refers to a steering state or condition of a steering operation in which the steering wheel 8 is in the process of being turned. The term "just finished turning" as used herein refers to a steering state or condition of a steering operation in which the steering wheel 8 has stopped turning after being turned. The term "currently returning" as used herein refers to a steering state or condition of a steering operation in which the steering wheel 8 turning in an opposite direction back to straight.

More specifically, the steering state determining section 13 determines that the steering wheel 8 has just begun to be turned if the vehicle speed is in the low speed region, the steering angle θh is in the vicinity of 0 degree, the steering angular speed dθh/dt is equal to or smaller than a first threshold value (i.e., is small), and the steering angular acceleration $d^2\theta h/dt^2$ is a positive value.

The steering state determining section 13 determines that the steering wheel 8 is currently turning if the traveling speed is in the low speed region, the steering angular speed dθh/dt is equal to or larger than the first threshold value (i.e., is medium), and the steering angular acceleration $d^2\theta h/dt^2$ is equal to or smaller than a second threshold value (i.e., is small).

The steering state determining section 13 determines that the steering wheel 8 has just finished being turned if the traveling speed is in the low speed region, the steering angle θh is in the vicinity of 0 degree with respect to straight, and the steering angular acceleration $d^2\theta h/dt^2$ is a negative value. In the vicinity of 0 degree refers to a range that is at least less than 15 degrees.

The steering state determining section 13 also determines that the steering wheel 8 has just finished being turned if the traveling speed is in the low speed region, the steering angle θh is equal to or larger than 15 degrees, and the steering angular acceleration $d^2\theta h/dt^2$ is a negative value.

The steering state determining section 13 also determines that the steering wheel 8 is currently returning from a turned state if the traveling speed is in the low speed region, the steering angle θh is equal to or larger than 15 degrees, and the steering angular acceleration $d^2\theta h/dt^2$ is a positive value.

Meanwhile, the steering state determining section 13 also determines that the steering wheel 8 has just begun to be turned if the vehicle speed is in the medium to high speed region, the steering angle θh is in the vicinity of 0 degree, the steering angular speed dθh/dt is equal to or smaller than the first threshold value (i.e., a small value), and the steering angular acceleration $d^2\theta h/dt^2$ is a positive value.

The steering state determining section 13 also determines that the steering wheel 8 is currently turning if the vehicle is traveling at a medium to high speed and the steering angular acceleration $d^2\theta h/dt^2$ is equal to or smaller than the second threshold value (i.e., a small value).

The steering state determining section 13 also determines that the steering wheel 8 has just finished being turned if the traveling speed is in the medium to high speed region and the steering angular acceleration $d^2\theta h/dt^2$ is a negative value.

The steering state determining section 13 also determines that the steering wheel 8 is currently returning from a turned state if the traveling speed is in the medium to high speed region, the steering angle θh is equal to or larger than 5 degrees, and the steering angular acceleration $d^2\theta h/dt^2$ is a positive value.

The steering angle/reaction force characteristic value setting section 14 calculates commands for setting the steering angle characteristic and the reaction force characteristic based on the traveling speed region determined by the vehicle speed determining section 12 and the steering state determined by the steering state determining section 13. The steering angle/reaction force characteristic value setting section 14 then sends the corresponding commands to the variable steered angle control section 4 and the power steering control section 6, respectively.

More specifically, if the vehicle speed determining section 12 determines that the traveling speed of the vehicle is in a low speed region and the steering state determining section 13 determines that the steering wheel 8 has just begun to be turned, then the steering angle/reaction force characteristic value setting section 14 sets the reaction force characteristic and the steering angle characteristic to provide a desired reaction force characteristic and a desired steering characteristic to the driver. In particular, in this steering state, the steering angle/reaction force characteristic value setting section 14 sets the spring coefficient of the reaction force characteristic to a medium value, i.e., a value in the vicinity of the middle of a first prescribed range (range based on phase characteristic range for a human 0.02 to 0.07 Nm/deg) and sets the viscosity coefficient of the reaction force characteristic to a small value, i.e., a value in the vicinity of the lower limit of a second prescribed range (range based on phase characteristic range for a human 0 to 0.002 Nm-s/deg). Also in this steering state, the steering angle/reaction force characteristic value setting section 14 sets the steering angle gain of the steering angle characteristic to a medium value (which changes depending on the vehicle speed), i.e., a value in the vicinity of the middle of a third prescribed range (4 to 25 degrees of steering angle per degree of the actual steered angle), and the phase of the steering angle characteristic to an advanced value, i.e., a value in the vicinity of the upper limit value of a fourth prescribed range (−20 to +20 deg/Hz).

The steering characteristic (gain and phase) and the reaction force characteristic (spring coefficient and viscosity (damping) coefficient) are set to values within the prescribed ranges based on the vehicle stability, the maximum value of the steering reaction force, and other vehicle properties. Preferably, the gain of the steering angle characteristic is held at fixed value until a frequency of approximately 10 Hz is reached, as shown in the frequency characteristic diagram.

If the vehicle speed determining section 12 determines that the traveling speed of the vehicle is in a low speed region and the steering state determining section 13 determines that the steering wheel 8 is currently turning, then the steering angle/reaction force characteristic value setting section 14 sets the reaction force characteristic and the steering angle characteristic such that the spring coefficient of the reaction force characteristic is a small value, i.e., a value in the vicinity of the lower limit of the first prescribed range, the viscosity coefficient of the reaction force characteristic is a large value, i.e., a value in the vicinity of the upper limit of the second prescribed range, the steering angle gain of the steering angle characteristic is a large value, i.e., a value in the vicinity of the upper limit of the third prescribed range, and the phase of the steering angle characteristic is a normal value, i.e., a value in the vicinity of the middle of the fourth prescribed range.

If the vehicle speed determining section 12 determines that the traveling speed of the vehicle is in a low speed region, the steering state determining section 13 determines that the steering wheel 8 has just finished being turned, and the steering angle is close to 0 degree, then the steering angle/reaction force characteristic value setting section 14 sets the reaction force characteristic and the steering angle characteristic such that the spring coefficient of the reaction force characteristic is a large value, i.e., a value in the vicinity of the upper limit of the first prescribed range, the viscosity coefficient of the reaction force characteristic is a large value, i.e., a value in the vicinity of the upper limit of the second prescribed range, the steering angle gain of the steering angle characteristic is a medium value, i.e., a value in the vicinity of the middle of the third prescribed range, and the phase of the steering angle characteristic is a normal value, i.e., a value in the vicinity of the middle of the fourth prescribed range.

If the vehicle speed determining section 12 determines that the traveling speed of the vehicle is in a low speed region, the steering state determining section 13 determines that the steering wheel 8 has just finished being turned, and the steering angle is close to 15 degree, then the steering angle/reaction force characteristic value setting section 14 sets the reaction force characteristic and the steering angle characteristic such that the spring coefficient of the reaction force characteristic is a medium value, i.e., a value in the vicinity of the middle of the first prescribed range, the viscosity coefficient of the reaction force characteristic is a large value, i.e., a value in the vicinity of the upper limit of the second prescribed range, the steering angle gain of the steering angle characteristic is a large value, i.e., a value in the vicinity of the upper limit of the third prescribed range, and the phase of the steering angle characteristic is a normal value, i.e., a value in the vicinity of the middle of the fourth prescribed range.

If the vehicle speed determining section 12 determines that the traveling speed of the vehicle is in a low speed region and the steering state determining section 13 determines that the steering wheel 8 is currently returning from a turned state, then the steering angle/reaction force characteristic value setting section 14 sets the reaction force characteristic and the steering angle characteristic such that the spring coefficient of the reaction force characteristic is a medium value, i.e., a value in the vicinity of the middle of the first prescribed range, the viscosity coefficient of the reaction force characteristic is a medium value, i.e., a value in the vicinity of the middle of the second prescribed range, the steering angle gain of the steering angle characteristic is a large value, i.e., a value in the vicinity of the upper limit of the third prescribed range, and the phase of the steering angle characteristic is an advanced value, i.e., a value in the vicinity of the upper limit of the fourth prescribed range.

Meanwhile, if the vehicle speed determining section 12 determines that the traveling speed of the vehicle is in a medium to high speed region and the steering state determining section 13 determines that the steering wheel 8 has just begun to be turned, then the steering angle/reaction force characteristic value setting section 14 sets the reaction force characteristic and the steering angle characteristic such that the spring coefficient of the reaction force characteristic is a medium value, i.e., a value in the vicinity of the middle of the first prescribed range, the viscosity coefficient of the reaction force characteristic is a small value, i.e., a value in the vicinity of the lower limit of the second prescribed range, the steering angle gain of the steering angle characteristic is a small value, i.e., a value in the vicinity of the lower limit of the third prescribed range, and the phase of the steering angle characteristic is a retarded value, i.e., a value in the vicinity of the lower limit of the fourth prescribed range.

If the vehicle speed determining section 12 determines that the traveling speed of the vehicle is in a medium to high speed region and the steering state determining section 13 determines that the steering wheel 8 is currently turning, then the steering angle/reaction force characteristic value setting section 14 sets the reaction force characteristic and the steering angle characteristic such that the spring coefficient of the reaction force characteristic is a medium value, i.e., a value in the vicinity of the middle of the first prescribed range, the viscosity coefficient of the reaction force characteristic is a medium value, i.e., a value in the vicinity of the middle of the second prescribed range, the steering angle gain of the steering angle characteristic is a small value, i.e., a value in the vicinity of the lower limit of the third prescribed range, and the phase of the steering angle characteristic is a normal value, i.e., a value in the vicinity of the middle of the fourth prescribed range.

If the vehicle speed determining section 12 determines that the traveling speed of the vehicle is in a medium to high speed region and the steering state determining section 13 determines that the steering wheel 8 has just finished being turned, then the steering angle/reaction force characteristic value setting section 14 sets the reaction force characteristic and the steering angle characteristic such that the spring coefficient of the reaction force characteristic is a medium value, i.e., a value in the vicinity of the middle of the first prescribed range, the viscosity coefficient of the reaction force characteristic is a medium value, i.e., a value in the vicinity of the middle of the second prescribed range, the steering angle gain of the steering angle characteristic is a small value, i.e., a value in the vicinity of the lower limit of the third prescribed range, and the phase of the steering angle characteristic is a normal value, i.e., a value in the vicinity of the middle of the fourth prescribed range.

Meanwhile, if the vehicle speed determining section 12 determines that the traveling speed of the vehicle is in a medium to high speed region and the steering state determining section 13 determines that the steering wheel 8 is currently returning from a turned state, then the steering angle/reaction force characteristic value setting section 14 sets the reaction force characteristic and the steering angle characteristic such that the spring coefficient of the reaction force characteristic is a large value, i.e., a value in the vicinity of the upper limit of the first prescribed range, the viscosity coefficient of the reaction force characteristic is a medium value, i.e., a value in the vicinity of the middle of the second prescribed range, the steering angle gain of the steering angle characteristic is a small value, i.e., a value in the vicinity of the lower limit of the third prescribed range, and the phase of the steering angle characteristic is a retarded value, i.e., a value in the vicinity of the lower limit of the fourth prescribed range.

The characteristic setting process executed by the power steering control section 6 and the variable steering angle device 4 will now be explained with reference to the flowchart shown in FIG. 9. The characteristic setting process is executed once each time a prescribed amount of time (e.g., 10 msec) elapses. In step S1, the traveling speed region (low speed region or medium to high speed region) of the vehicle is determined based on the vehicle speed detected by the vehicle speed sensor 1.

In step S2, the steering state achieved by the driver (i.e., whether the steering wheel has just begun to be turned, is currently turning, has just finished being turned, or is currently returning from a turned state) is determined based on the steering angle $\theta h$ detected by the angle sensor 2, the steering angular speed $d\theta h/dt$ and the steering angular acceleration $d^2\theta h/dt^2$ calculated based on the steering angle $\theta h$, and the traveling speed region outputted from the vehicle speed determining section 12.

In step S3, commands for setting the steering angle characteristic and the reaction force characteristic are calculated based on the traveling speed region determined by the vehicle speed determining section 12 and the steering state determined by the steering state determining section 13 and the respective commands are sent to the variable steered angle control section 4 and the power steering control section 6. The processing then ends.

The operation of the steering mechanism control system in accordance with the present invention will now be explained using some examples.

Consider a situation in which the vehicle is traveling at 30 km/h on a local road or street and the driver begins turning the steering wheel 8 in order to turn at an intersection. The characteristic setting process executed by the variable steered angle control section 4 and the power steering control section 6 in such a situation will now be explained. As shown in FIG. 7, the vehicle speed determining section 12 determines that the vehicle is traveling in a low speed region based on the vehicle speed received from the vehicle speed sensor 1 and sends the determination result to the steering state determining section 13 and the steering angle/reaction force characteristic value setting section 14. Simultaneously, as shown in FIG. 7, the steering state determining section 13 determines that the steering wheel 8 has just begun to be turned based on the steering angle $\theta h$ detected by the angle sensor 2, the steering angular speed $d\theta h/dt$ and the steering angular acceleration $d^2\theta h/dt^2$ calculated based on the steering angle $\theta h$, and sends the determination result to the steering angle/reaction force characteristic value setting section 14.

Based on the determinations that the traveling speed is in a low speed region and that the steering wheel 8 has just begun to be turned, the steering angle/reaction force characteristic value setting section 14 calculates commands for setting the steering angle characteristic and the reaction force characteristic and sends the commands to the variable steered angle control section 4 and the power steering control section 6. The variable steered angle control section 4 sets the steering angle gain of the steering angle characteristic to a medium value (i.e., a value in the vicinity of the middle of the third prescribed range) and the phase of the steering angle characteristic to an advanced value (i.e., a value in the vicinity of the upper limit of the fourth prescribed range). The variable steered angle control section 4 then controls the ratio of the steered angle of the steerable wheels 11 to the steering angle of the steering wheel 8 in accordance with the set steering angle characteristic.

At the same time, the power steering control section 6 sets the spring coefficient of the reaction force characteristic to a medium value (i.e., a value in the vicinity of the middle of the first prescribed range) and sets the viscosity coefficient of the reaction force characteristic to a low value (i.e., a value in vicinity of the lower limit of the second prescribed range). The power steering control section 6 then controls the reaction force exerted by the power steering device 7 in response to operation of the steering wheel 8 based on the set reaction force characteristic.

Now, assume that as the driver continues to turn the steering wheel 8, the steering angular speed $d\theta h/dt$ increases beyond the first threshold value and the steering angular acceleration $d^2\theta h/dt^2$ becomes equal to or smaller than the second threshold value.

The steering state determining section 13 determines that the steering wheel 8 is currently turning and sends that determination result to the steering angle/reaction force characteristic value setting section 14. The steering angle/reaction force characteristic value setting section 14 calculates commands for setting the steering angle characteristic and the reaction force characteristic based on the determination result and sends the commands to the variable steered angle control section 4 and the power steering control section 6.

The variable steered angle control section 4 sets the steering angle gain of the steering angle characteristic to a large value (i.e., a value in the vicinity of the upper limit of the third prescribed range) and the phase of the steering angle characteristic to a normal value (i.e., a value in the vicinity of the middle of the fourth prescribed range). The variable steered angle control section 4 then controls the ratio of the steered angle of the steerable wheels 11 to the steering angle in accordance with the set steering angle characteristic.

At the same time, the power steering control section 6 sets the spring coefficient of the reaction force characteristic to a small value (i.e., a value in the vicinity of the lower limit of the first prescribed range) and sets the viscosity coefficient of the reaction force characteristic to a large value (i.e., a value in vicinity of the upper limit of the second prescribed range). The power steering control section 6 then controls the reaction force exerted by the power steering device 7 in response to operation of the steering wheel 8 based on the set reaction force characteristic.

Now assume the vehicle has reached the vicinity of the apex of its turn about the corner of the intersection. Thus, the driver has fixed the steering angle, the steering angle θh has reached the vicinity of 0 degree, and the steering angular acceleration $d^2\theta h/dt^2$ has become a negative value. The steering state determining section 13 then determines that the steering wheel 8 has just finished being turned and sends that determination result to the steering angle/reaction force characteristic value setting section 14. The steering angle/reaction force characteristic value setting section 14 calculates commands for setting the steering angle characteristic and the reaction force characteristic based on the determination result and sends the commands to the variable steered angle control section 4 and the power steering control section 6.

The variable steered angle control section 4 sets the steering angle gain of the steering angle characteristic to a medium value (i.e., a value in the vicinity of the middle of the third prescribed range) and the phase of the steering angle characteristic to a normal value (i.e., a value in the vicinity of the middle of the fourth prescribed range). The variable steered angle control section 4 then controls the ratio of the steered angle of the steerable wheels 11 to the steering angle of the steering wheel 8 accordance with the steering angle characteristic.

At the same time, the power steering control section 6 sets the spring coefficient of the reaction force characteristic to a large value (i.e., a value in the vicinity of the upper limit of the first prescribed range) and sets the viscosity coefficient of the reaction force characteristic to a large value (i.e., a value in vicinity of the upper limit of the second prescribed range). The power steering control section 6 then controls the reaction force exerted by the power steering device 7 in response to operation of the steering wheel 8 based on the reaction force characteristic.

Now assume the vehicle has passed the vicinity of the apex of its turn about the corner of the intersection. Thus, the driver has returned the steering wheel 8 such that the steering angle θh has reached the 15 degrees or more and the steering angular acceleration $d^2\theta h/dt^2$ has become a positive value.

The steering state determining section 13 determines that the steering wheel 8 is currently returning from a turned state and sends that determination result to the steering angle/reaction force characteristic value setting section 14. The steering angle/reaction force characteristic value setting section 14 calculates commands for setting the steering angle characteristic and the reaction force characteristic based on the determination result and sends the commands to the variable steered angle control section 4 and the power steering control section 6.

The variable steered angle control section 4 sets the steering angle gain of the steering angle characteristic to a large value (i.e., a value in the vicinity of the upper limit of the third prescribed range) and the phase of the steering angle characteristic to an advanced value (i.e., a value in the vicinity of the upper limit of the fourth prescribed range). The variable steered angle control section 4 then controls the ratio of the steered angle of the steerable wheels 11 to the steering angle in accordance with the steering angle characteristic.

At the same time, the power steering control section 6 sets the spring coefficient of the reaction force characteristic to a medium value (i.e., a value in the vicinity of the middle of the first prescribed range) and sets the viscosity coefficient of the reaction force characteristic to a medium value (i.e., a value in vicinity of the upper limit of the second prescribed range). The power steering control section 6 then controls the reaction force exerted by the power steering device 7 in response to operation of the steering wheel 8 based on the reaction force characteristic.

Consider a situation in which the vehicle is traveling at 90 km/h on a highway and the driver begins turning the steering wheel 8 in order to turn through a curve. The characteristic setting process executed by the variable steered angle control section 4 and the power steering control section 6 in such a situation will now be explained. As shown in FIG. 7, the vehicle speed determining section 12 determines that the vehicle is traveling in a medium to high speed region based on the vehicle speed received from the vehicle speed sensor 1 and sends the determination result to the steering state determining section 13 and the steering angle/reaction force characteristic value setting section 14.

Simultaneously, as shown in FIG. 7, the steering state determining section 13 determines that the steering wheel 8 has just begun to be turned based on the steering angle θh detected by the angle sensor 2, the steering angular speed dθh/dt and the steering angular acceleration $d^2\theta h/dt^2$ calculated based on the steering angle θh, and the traveling speed region outputted from the vehicle speed determining section 12 and sends the determination result to the steering angle/reaction force characteristic value setting section 14.

Based on the determinations that the traveling speed is in a medium to high speed region and that the steering wheel 8 has just begun to be turned, the steering angle/reaction force characteristic value setting section 14 calculates commands for setting the steering angle characteristic and the reaction force characteristic and sends the commands to the variable steered angle control section 4 and the power steering control section 6.

The variable steered angle control section 4 sets the steering angle gain of the steering angle characteristic to a small value (i.e., a value in the vicinity of the lower limit of the third prescribed range) and the phase of the steering angle characteristic to a retarded value (i.e., a value in the vicinity of the lower limit of the fourth prescribed range). The variable steered angle control section 4 then controls the ratio of the steered angle of the steerable wheels 11 to the steering angle of the steering wheel 8 in accordance with the steering angle characteristic.

At the same time, the power steering control section 6 sets the spring coefficient of the reaction force characteristic to a medium value (i.e., a value in the vicinity of the middle of the first prescribed range) and sets the viscosity coefficient of the reaction force characteristic to a small value (i.e., a value in vicinity of the lower limit of the second prescribed range). The power steering control section 6 then controls the reaction force exerted by the power steering device 7 in response to operation of the steering wheel 8 based on the reaction force characteristic.

Now assume that as the driver continues to turn the steering wheel 8, the angular acceleration $d^2\theta h/dt^2$ becomes equal to or smaller than the second threshold value (i.e., becomes a small value). The steering state determining section 13 determines that the steering wheel 8 is currently turning and sends that determination result to the steering angle/reaction force characteristic value setting section 14. The steering angle/reaction force characteristic value setting section 14 calculates commands for setting the steering angle characteristic and the reaction force characteristic based on the determination result and sends the commands to the variable steered angle control section 4 and the power steering control section 6.

The variable steered angle control section 4 sets the steering angle gain of the steering angle characteristic to a small value (i.e., a value in the vicinity of the lower limit of the third prescribed range) and the phase of the steering angle characteristic to a normal value (i.e., a value in the vicinity of the middle of the fourth prescribed range). The variable steered angle control section 4 then controls the ratio of the steered angle of the steerable wheels 11 to the steering angle of the steering wheel 8 in accordance with the steering angle characteristic.

At the same time, the power steering control section 6 sets the spring coefficient of the reaction force characteristic to a medium value (i.e., a value in the vicinity of the middle of the first prescribed range) and sets the viscosity coefficient of the reaction force characteristic to a medium value (i.e., a value in vicinity of the upper limit of the second prescribed range). The power steering control section 6 then controls the reaction force exerted by the power steering device 7 in response to operation of the steering wheel 8 based on the reaction force characteristic.

Now assume the vehicle has reached the vicinity of the apex of the curve. Thus, the driver has fixed the steering angle and the steering angular acceleration $d^2\theta h/dt^2$ becomes a negative value. The steering state determining section 13 determines that the steering wheel 8 has just finished being turned and sends that determination result to the steering angle/reaction force characteristic value setting section 14. The steering angle/reaction force characteristic value setting section 14 calculates commands for setting the steering angle characteristic and the reaction force characteristic based on the determination result and sends the commands to the variable steered angle control section 4 and the power steering control section 6.

The variable steered angle control section 4 sets the steering angle gain of the steering angle characteristic to a small value (i.e., a value in the vicinity of the lower limit of the third prescribed range) and the phase of the steering angle characteristic to a normal value (i.e., a value in the vicinity of the middle of the fourth prescribed range). The variable steered angle control section 4 then controls the ratio of the steered angle of the steerable wheels 11 to the steering angle of the steering wheel 8 in accordance with the steering angle characteristic.

At the same time, the power steering control section 6 sets the spring coefficient of the reaction force characteristic to a medium value (i.e., a value in the vicinity of the middle of the first prescribed range) and sets the viscosity coefficient of the reaction force characteristic to a medium value (i.e., a value in vicinity of the upper limit of the second prescribed range). The power steering control section 6 then controls the reaction force exerted by the power steering device 7 in response to operation of the steering wheel 8 based on the reaction force characteristic.

Now assume the vehicle has passed the vicinity of the apex of the corner. Thus, the driver has returned the steering wheel 8 such that the steering angle θh has reached the 5 degrees or more and the steering angular acceleration $d^2\theta h/dt^2$ has become a positive value. The steering state determining section 13 determines that the steering wheel 8 is currently returning from a turned state and sends that determination result to the steering angle/reaction force characteristic value setting section 14. The steering angle/reaction force characteristic value setting section 14 calculates commands for setting the steering angle characteristic and the reaction force characteristic based on the determination result and sends the commands to the variable steered angle control section 4 and the power steering control section 6.

The variable steered angle control section 4 sets the steering angle gain of the steering angle characteristic to a small value (i.e., a value in the vicinity of the lower limit of the third prescribed range) and the phase of the steering angle characteristic to a retarded value (i.e., a value in the vicinity of the lower limit of the fourth prescribed range). The variable steered angle control section 4 then controls the ratio of the steered angle of the steerable wheels 11 to the steering angle in accordance with the steering angle characteristic.

At the same time, the power steering control section 6 sets the spring coefficient of the reaction force characteristic to a large value (i.e., a value in the vicinity of the upper limit of the first prescribed range) and sets the viscosity coefficient of the reaction force characteristic to a medium value (i.e., a value in vicinity of the upper limit of the second prescribed range). The power steering control section 6 then controls the reaction force exerted by the power steering device 7 in response to operation of the steering wheel 8 based on the reaction force characteristic.

In this embodiment, the variable steered angle control section 4 shown in FIG. 1 constitutes the steered angle control section. The vehicle speed sensor 1 shown in FIG. 1 constitutes the vehicle speed detecting device. The variable steered angle control section 4 shown in FIG. 1 and the vehicle speed determining section 12 shown in FIG. 7 constitutes the speed region determining section. The angle sensor 2 shown in FIG. 1 constitutes the steering angle determining section. The variable steered angle control section 4 shown in FIG. 1 and the steering state determining section 13 shown in FIG. 7 constitute the steering state determining section. The variable steered angle control section 4 shown in FIG. 1 and the steering angle/reaction force characteristic value setting section 14 shown in FIG. 7 constitute the characteristic setting section. The steering angle ratio varying device 5 shown in FIG. 1 constitutes the steering reaction force control device.

Basically, the steering mechanism control system in accordance with the illustrated embodiment sets a steering angle characteristic and a reaction force characteristic based on the traveling speed and steering state of the vehicle and controls the ratio of the steered angle of the steerable wheels to the steering angle and the by the power steering device 7 in response to an operation of the steering wheel based on the set steering angle characteristic and reaction force characteristic. Since the steering angle characteristic and the steering reaction force characteristic can be varied in accordance with the running condition of the vehicle, steering characteristics that are appropriate for a variety of running conditions can be imposed.

In the illustrated embodiment, the steering state is determined as one of the following states: the steering wheel has just begun to be turned, the steering wheel is currently turning, the steering wheel has just finished being turned, or the steering wheel is currently returning from a turned state. As a result, the steering angle characteristic and the reaction force characteristic can be set in accordance with whether the steering wheel has just begun to be turned, is currently turning, has just finished being turned, or is currently returning from a turned state and control can be executed in manner that is appropriate in view of the steering state.

In the illustrated embodiment, a gain and a phase of the steering angle characteristic and a spring expression and a damping portion of the reaction force characteristic are set based on the traveling speed region and the steering state of the vehicle. As a result, a control characteristic that corresponds to the gain and phase of the steering angle characteristic and the spring expression and damping portion of the reaction force characteristic.

In the illustrated embodiment, the damping portion of the reaction force characteristic is decreased and the phase of the steering angle characteristic is advanced when it has been determined that the traveling speed is in a low speed region and the steering wheel has just begun to be turned. As a result, when, for example, the vehicle turns a corner at an intersection, the rate at which the steering angle ratio increases can be increased so as to compensate for a human time delay factor and the turning performance of the vehicle can be improved.

More specifically, in general, a person has a natural tendency to lag slightly behind when operating a vehicle so as to track a target. Consequently, when a situation requires quick and accurate operation, a person will compensate for this natural delay by changing the characteristics of his or her body. As shown in FIG. 5(*b*), the natural delay of the driver can be absorbed by the steering system by advancing the phase of the steering angle characteristic. As a result, the driver can operate the vehicle with his or her natural driving characteristics and the target can be tracked with a natural steering feel (see section a of FIG. 10).

Figure 11:
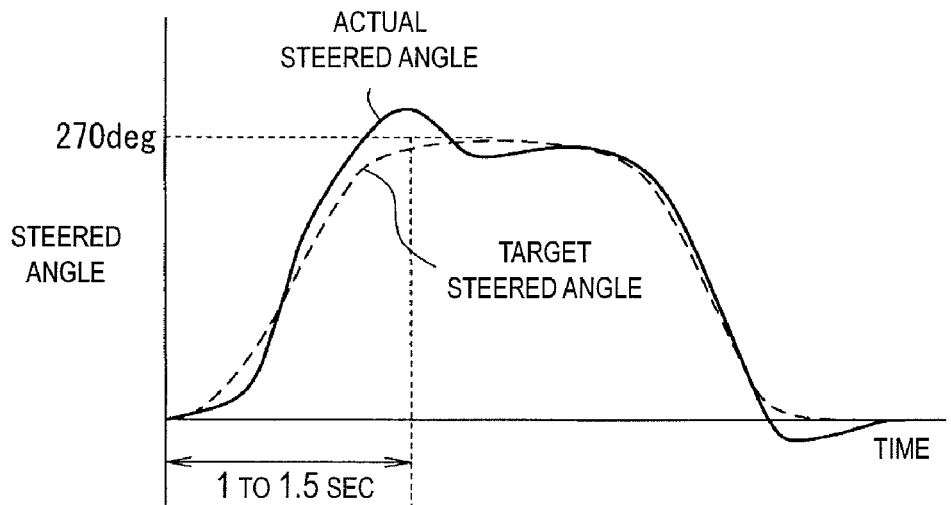
FIG. 11 is a diagram for illustrating the operation of a steering mechanism control system existing without implementing the controlling (setting) the steering characteristics.

Conversely, if neither the reaction force characteristic nor the steering angle characteristic is modified when a steering operation is started while the vehicle is traveling in a low speed region, then, as shown in FIG. 11, the natural human delay factor will cause the rise in steering angle to be delayed and the turning performance of the vehicle will decline.

In the illustrated embodiment, if is determined that the traveling speed is in a low speed region, and the steering wheel is currently turning, the spring portion of the reaction force characteristic is decreased and the damping portion of the reaction force characteristic is increased. As a result, even if the gain of the steering angle characteristic is large, the angular speed of the steering wheel can be suppressed by increasing the reaction force in proportion to the angular speed, thereby preventing the turning rate of the vehicle from increasing excessively.

Figure 10:
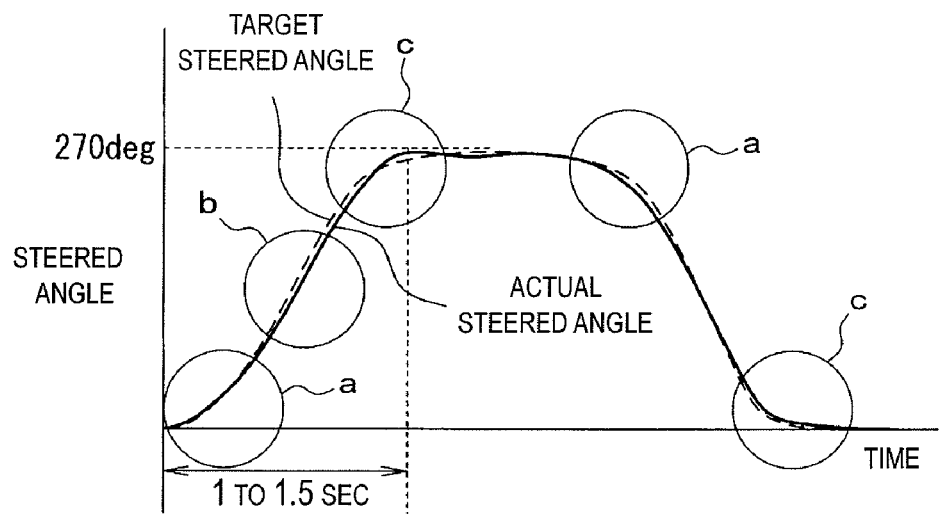
FIG. 10 is a graph for illustrating the operation of a steering mechanism control system implementing the controlling (setting) the steering characteristics.

Additionally, since the effect of the damping portion of the reaction force characteristic increases with respect to the effect of the spring portion, the steering speed can be prevented from becoming too fast without applying an excessive reaction force (see section b of FIG. 10).

In the illustrated embodiment, if it is determined that the traveling speed is in a low speed region and the steering wheel has just finished being turned, then the damping portion of the reaction force characteristic is increased. As a result, even if the gain of the steering angle characteristic is large, the amount by which the steered angle overshoots the target steered angle can be reduced and the convergence of the steering angle with respect to (toward) the target steered angle can be improved.

In the illustrated embodiment, if it is determined that the traveling speed is in a low speed region and the steering wheel has just finished being turned, then the spring portion of the reaction force characteristic is increased. As a result, when the steering wheel is returned, it is easier to determine when the vehicle is traveling straight based on the steering force and the convergence of the steering angle can be improved.

That is, the convergence toward the target angle can be improved such that the amount of overshoot existing when turning (steering) is finished can be reduced. Additionally, since the spring portion or characteristic is increased, the degree to which the vehicle feels on center when it returns to straight travel can be improved and the vehicle can be returned more readily to straight travel (see section c of FIG. 10).

In the illustrated embodiment, if it is determined that the traveling speed is in a low speed region and the steering wheel is currently returning from a turned state, then the phase of the steering angle characteristic is advanced. As a result, when the steering wheel is returned, the vehicle can be returned to straight travel more quickly by advancing the phase of the steered angle with respect to the steering angle.

In the illustrated embodiment, if it is determined that the traveling speed is in a low speed region and the steering angle is small, the gain of the steering angle characteristic is decreased.

As a result, the amount by which the gain of the steering angle characteristic is increased can be reduced and the vehicle can be prevented from swaying due to small variations in the steering angle. Thus, the direction of the vehicle can be controlled well while traveling straight and fine adjustments in traveling direction can be accomplished with ease in parking lots and narrow roads.

Figure 12:
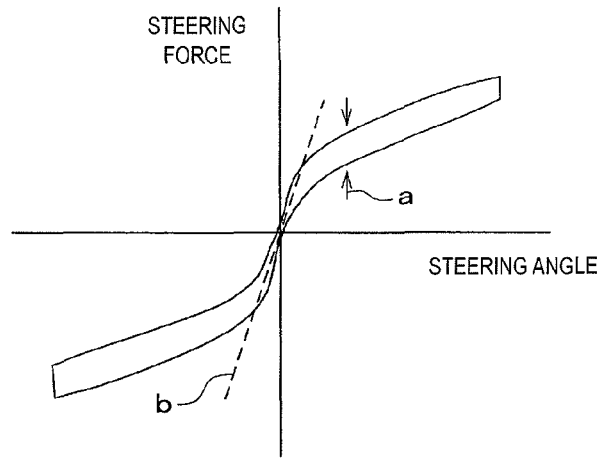
FIG. 12 is a diagram for illustrating the operation of a steering mechanism control system in accordance with the present invention.
Figure 13:
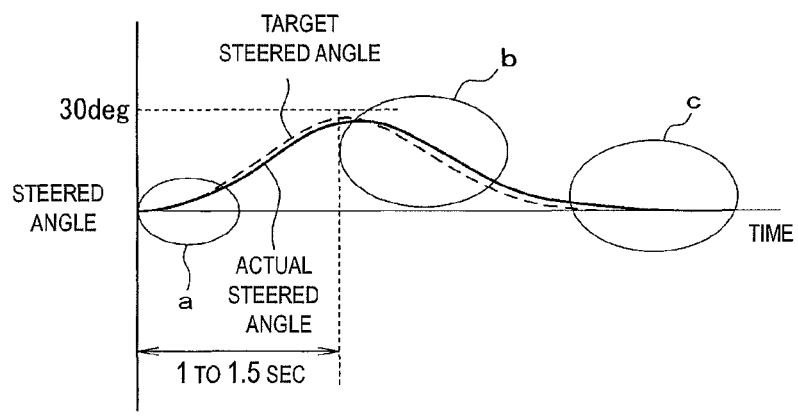
FIG. 13 is a diagram for illustrating the operation of a steering mechanism control system in accordance with the present invention.

In the illustrated embodiment, if it is determined that the traveling speed is in a medium to high speed region and the steering wheel has just begun being turned, the damping portion of the reaction force characteristic is decreased. When the steering angle gain is small and the vehicle is traveling at a medium to high speed, the steering speed can be increased more rapidly and a quick steering operation can be accommodated reducing the viscosity force when operation (turning) of the steering wheel first begins. As a result, the steering delay that occurs at the start of a steering operation can be reduced (FIG. 12, and section a of FIG. 13).

Figure 14:
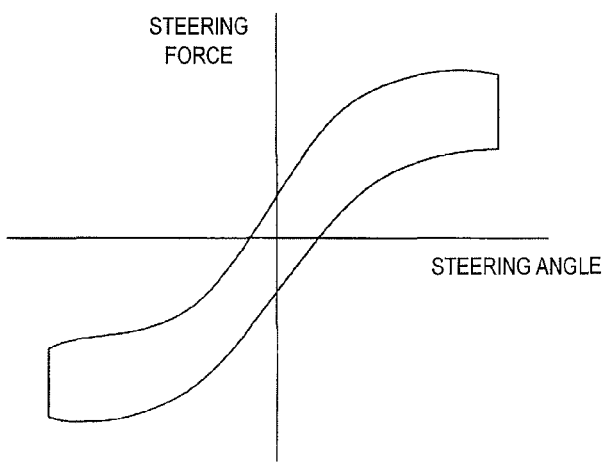
FIG. 14 is a diagram for illustrating the operation of a steering mechanism control system existing prior to implementing the controlling (setting) the steering characteristics.
Figure 15:
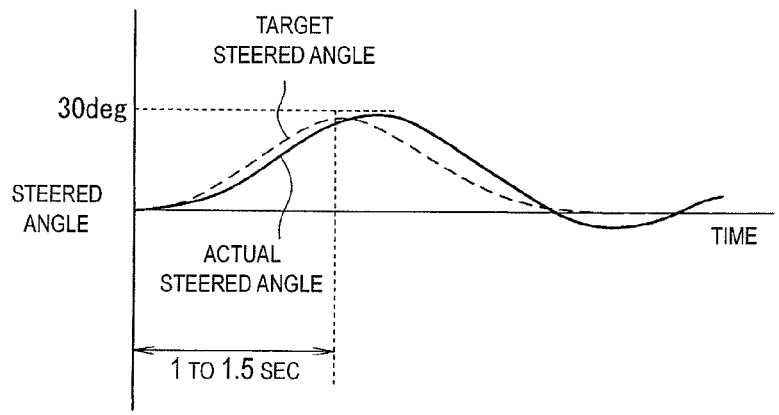
FIG. 15 is a diagram for illustrating the operation of a steering mechanism control system existing prior to implementing the controlling (setting) the steering characteristics.

Conversely, if neither the reaction force characteristic nor the steering angle characteristic is modified when the steering operation is started while the vehicle is traveling in a medium to high speed region, then, as shown in FIGS. 14 and 15, a large steering force will be required because the viscosity force will be high and a steering delay will occur at the start of the steering operation.

In the illustrated embodiment, if it is determined that the traveling speed is in a medium to high speed region and the steering wheel is currently returning from a turned state, the spring portion of the reaction force is increased. As a result, when the steering wheel is returned to a straight travel direction while the gain of the steering angle characteristic is small and the vehicle is traveling in a medium to high speed region, the straight travel direction can be identified readily based on the steering force and the convergence of the steering angle toward the straight direction can be improved (the steering wheel 8 can be returned more easily (FIG. 12 and section b of FIG. 13)).

Figure 16A:
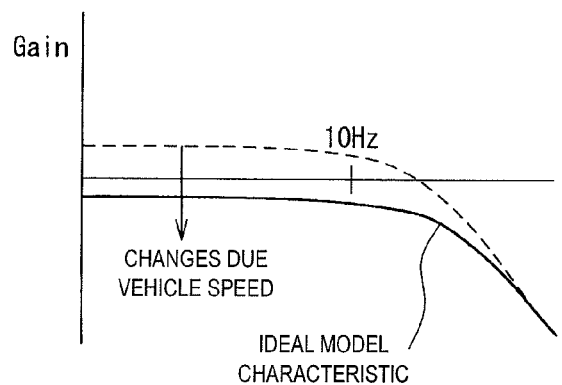
FIG. 16($a$) is a Bode curve diagram illustrating the gain of the steering characteristics in terms of frequency during a steering operation using the steering mechanism control system.
FIG. 16(b) is a Bode curve diagram illustrating the phase of the steering characteristics in terms of frequency during a steering operation using the steering mechanism control system.
Figure 16B:
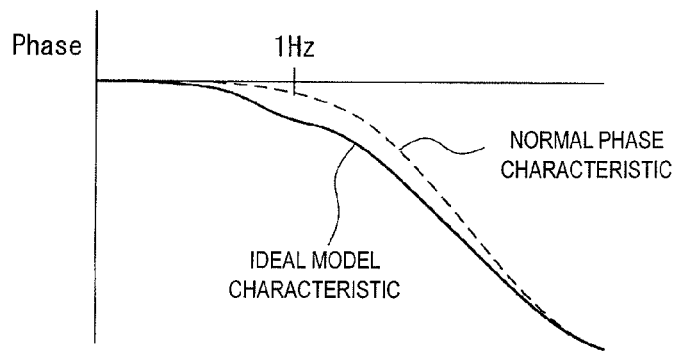

In the illustrated embodiment, if it is determined that the traveling speed is in a medium to high speed region and the steering wheel has just begun to be turned or is currently returning from a turned state, then the phase of the steering angle characteristic is retarded as shown in FIG. 16. As a result, when the gain of the steering angle characteristic is small and the vehicle is traveling at a high speed, the nose of the vehicle can be prevented from turning abruptly in the event that the steered angle of the steerable wheels is slightly delayed with respect to the steering operation. Thus, the traveling stability of the vehicle can be improved during high speed travel.

Also, the vehicle can be prevented from swaying if the steering speed is suddenly increased in order to adjust the path of the vehicle while the vehicle is traveling at a medium to high speed.

A vehicle in accordance with the embodiment sets a steering angle characteristic and a reaction force characteristic based on the traveling speed and steering state of the vehicle and controls the ratio of the steered angle of the steerable wheels to the steering angle and the reaction force exerted by the power steering device 7 in response to an operation of the steering wheel based on the set steering angle characteristic and reaction force characteristic. Since the steering angle characteristic and the steering reaction force characteristic can be varied in accordance with the running condition of the vehicle, steering characteristics that are appropriate for a variety of running conditions can be imposed.

A steering mechanism control method in accordance with the embodiment sets a steering angle characteristic and a reaction force characteristic based on the traveling speed and steering state of the vehicle and controls the ratio of the steered angle of the steerable wheels to the steering angle of the steering wheel and the reaction force exerted by the power steering device 7 in response to an operation of the steering wheel based on the set steering angle characteristic and reaction force characteristic. Since the steering angle characteristic and the steering reaction force characteristic can be varied in accordance with the running condition of the vehicle, steering characteristics that are appropriate for a variety of running conditions can be imposed.

Thus, while only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A steering mechanism control system comprising:
   a steering angle ratio varying device configured to control a ratio of a steered angle of a steerable wheel with respect to a steering input angle in accordance with a steering angle characteristic;
   a steering angle determining section configured to determine the steering input angle resulting from a steering operation;
   a steering state determining section configured to determine a steering state based on the steering input angle detected by the steering angle determining section, the steering state determining section being further configured to determine the steering state as one of: a driver-operated steering device has just begun turning, the driver-operated steering device is currently turning, the driver-operated steering device has just finished turning, and the driver-operated steering device is currently returning from a turned state;
   a vehicle speed determining section configured to detect a vehicle speed;
   a speed region determining section configured to determine a traveling speed region of the vehicle based on the vehicle speed that was detected by the vehicle speed determining section;
   a steering reaction force control device configured to control a steering reaction force in accordance with a reaction force characteristic, the steering reaction force being a reaction force that acts in opposition to the steering operation during the steering operation; and
   a characteristic setting section configured to set both the steering angle characteristic of the steering angle ratio varying device and the reaction force characteristic of the steering reaction force control device based on a combination of the steering state determined by the steering state determining section and the traveling speed region determined by the speed region determining section.

2. The steering mechanism control system as recited in claim 1, wherein
   the characteristic setting section is further configured to set a gain and a phase of the steering angle characteristic, and to set a spring portion and a damping portion of the reaction force characteristic based on the steering state determined by the steering state determining section.

3. The steering mechanism control system as recited in claim 1, wherein
   the characteristic setting section is further configured to set the gain and a phase of the steering angle characteristic, and to set a spring portion and a damping portion of the reaction force characteristic based on the traveling speed region determined by the speed region determining section and the steering state determined by the steering state determining section.

4. The steering mechanism control system as recited in claim 3, wherein
   the characteristic setting section is further configured to decrease the damping portion of the reaction force characteristic and advance the phase of the steering angle characteristic when the speed region determining section has determined that the vehicle is in a low speed region and the steering state determining section has determined that a driver-operated steering device has just begun turning.

5. The steering mechanism control system as recited in claim 3, wherein
   the characteristic setting section is further configured to decrease the spring portion of the reaction force characteristic and increase the damping portion of the reaction force characteristic when the speed region determining section has determined that the vehicle is in a low speed region and the steering state determining section has determined that a driver-operated steering device is currently turning.

6. The steering mechanism control system as recited in claim 3, wherein
   the characteristic setting section is further configured to increase the damping portion of the reaction force characteristic when the speed region determining section has determined that the vehicle is in a low speed region and the steering state determining section has determined that a driver-operated steering device has just finished turning.

7. The steering mechanism control system as recited in claim 3, wherein
   the characteristic setting section is further configured to increase the spring portion of the reaction force characteristic when the speed region determining section has determined that the vehicle is in a low speed region and the steering state determining section has determined that a driver-operated steering device has just finished turning.

8. The steering mechanism control system in as recited in claim 3, wherein
the characteristic setting section is further configured to advance the phase of the steering angle characteristic when the speed region determining section has determined that the vehicle is in a low speed region and the steering state determining section has determined that a driver-operated steering device is currently returning from a turned state.

9. The steering mechanism control system as recited in claim 3, wherein
the characteristic setting section is further configured to decrease the gain of the steering angle characteristic when the speed region determining section has determined that the vehicle is in a low speed region and the steering angle detected by the steering angle determining section is smaller than a set threshold value.

10. The steering mechanism control system as recited in claim 3, wherein
the characteristic setting section is further configured to decrease the damping portion of the reaction force characteristic when the speed region determining section has determined that the vehicle is in a medium to high speed region and the steering state determining section has determined that a driver-operated steering device has just begun turning.

11. The steering mechanism control system in as recited in claim 3, wherein
the characteristic setting section is further configured to increase the spring portion of the reaction force characteristic when the speed region determining section has determined that the vehicle is in a medium speed region to a high speed region and the steering state determining section has determined that a driver-operated steering device is currently returning from a turned state.

12. The steering mechanism control system as recited in claim 3, wherein
the characteristic setting section is further configured to retard the phase of the steering angle characteristic when the speed region determining section has determined that the vehicle is in a medium to high speed region and the steering state determining section has determined that a driver-operated steering device has just begun turning or is currently returning from a turned state.

13. A vehicle equipped with the steering mechanism control system as recited in claim 1, wherein
the vehicle driving assist system is operatively installed to a vehicle body that includes a driver-operated steering device provided on a frontward portion of the vehicle body.

14. A steering mechanism control system comprising:
steering angle ratio varying means for controlling a ratio of a steered angle of a steerable wheel with respect to a steering input angle in accordance with a steering angle characteristic;
steering angle determining means for determining the steering input angle resulting from a steering operation;
steering state determining means for determining a steering state based on the steering input angle detected by the steering angle determining means, and for determining the steering state as one of: a driver-operated steering device has just begun turning, the driver-operated steering device is currently turning, the driver-operated steering device has just finished turning, and the driver-operated steering device is currently returning from a turned state;
vehicle speed determining means for detecting a vehicle speed;
speed region determining means for determining a traveling speed region of the vehicle based on the vehicle speed that was detected by the vehicle speed determining means;
steering reaction force control means for controlling a steering reaction force in accordance with a reaction force characteristic, the steering reaction force being a reaction force that acts in opposition to the steering operation during the steering operation; and
characteristic setting means for setting both the steering angle characteristic of the steering angle ratio varying means and the reaction force characteristic of the steering reaction force control means based on a combination of the steering state as determined by the steering state determining means and the traveling speed region as determined by the speed region determining means.

15. The steering mechanism control system as recited in claim 14, wherein
the characteristic setting means further performs functions of setting the gain and a phase of the steering angle characteristic, and setting a spring portion and a damping portion of the reaction force characteristic based on the traveling speed region determined by the speed region determining means and the steering state determined by the steering state determining means.

16. The steering mechanism control system in as recited in claim 1, wherein
the characteristic setting section is further configured to set a gain of the steering angle characteristic to an increased value when a low speed region has been determined by the speed region determining section and to a decreased value when a high speed region has been determined by the speed region determining section.

17. The steering mechanism control system in as recited in claim 14, wherein
the characteristic setting means further performs functions of setting a gain of the steering angle characteristic to an increased value when a low speed region has been determined by the speed region determining means and to a decreased value when a high speed region has been determined by the speed region determining means.

* * * * *